(12) United States Patent
McDonald et al.

(10) Patent No.: US 6,269,057 B1
(45) Date of Patent: Jul. 31, 2001

(54) FOCUS ERROR SIGNAL GENERATION USING A BIREFRINGENT LENS WITH CONFOCAL DETECTION

(75) Inventors: Mark E. McDonald, Mountain View; Robert R. McLeod, Morgan Hill, both of CA (US)

(73) Assignee: Siros Technologies, Inc., San Jose, CA (US)

( * ) Notice: Subject to any disclaimer, the term of this patent is extended or adjusted under 35 U.S.C. 154(b) by 0 days.

(21) Appl. No.: 09/229,138

(22) Filed: Jan. 12, 1999

(51) Int. Cl.[7] .................................................. G11B 7/00
(52) U.S. Cl. ..................... 369/44.23; 369/112.17; 369/118
(58) Field of Search ............................. 369/44.14, 44.23, 369/44.24, 44.41, 110, 112, 118

(56) References Cited

U.S. PATENT DOCUMENTS

| | | |
|---|---|---|
| 4,467,462 | 8/1984 | Shibata . |
| 4,775,968 | 10/1988 | Ohsato . |
| 4,924,455 | 5/1990 | Fujie et al. ........................ 369/44.21 |
| 5,263,011 | 11/1993 | Maeda et al. ..................... 369/44.27 |
| 5,408,453 | 4/1995 | Holtslag et al. .................. 369/44.23 |
| 5,499,231 | 3/1996 | Fennema et al. . |
| 5,526,336 | 6/1996 | Park et al. .............................. 369/94 |
| 5,559,773 | 9/1996 | Kentatsu et al. .................. 369/44.42 |
| 5,627,814 | 5/1997 | Lee ...................................... 369/116 |
| 5,671,207 | 9/1997 | Park . |
| 5,682,372 | 10/1997 | Yamakawa et al. .................... 369/94 |
| 5,691,971 | 11/1997 | Kim . |
| 5,696,743 | 12/1997 | Kawasaki et al. . |
| 5,701,288 | 12/1997 | Seong . |
| 5,737,295 | 4/1998 | Lee ...................................... 369/103 |
| 5,740,136 | 4/1998 | Tsutsui et al. .................... 369/44.25 |
| 5,748,597 | 5/1998 | Kim ...................................... 369/94 |
| 5,754,512 | 5/1998 | Komma et al. . |
| 5,757,744 | 5/1998 | Akkermans ...................... 369/44.25 |
| 5,764,606 | 6/1998 | Fukumoto et al. .............. 369/44.41 |
| 5,768,242 | 6/1998 | Juday ................................ 369/103 |
| 5,790,493 | 8/1998 | Takeya et al. . |
| 5,793,720 | 8/1998 | Nishikata ........................ 369/44.25 |
| 5,793,721 | 8/1998 | Akkermans ...................... 369/44.27 |
| 5,811,789 | 9/1998 | Nix . |

*Primary Examiner*—Paul W. Huber
(74) *Attorney, Agent, or Firm*—Sierra Patent Group, Ltd.

(57) ABSTRACT

An improved focus error signal generator device including two optical lenses in series; a birefringent optical lens followed by a standard optical lens, the lenses being disposed in the path of a return read beam wherein the birefringent optical lens has a first and second focal plane. A pinhole is disposed in the path of the return read beam in close proximity to the first and second focal planes. A polarizing beam splitter is positioned after the second focal plane and serves to split the return read beam into two light beams of polarization associated with the first and second focal planes. First and second detectors are positioned so as to read the two light beams signals output from the polarizing beam splitter and the detectors are connected to an electrical differencing circuit having an output to an optical head servo system.

16 Claims, 11 Drawing Sheets

FOCUS ERROR SIGNAL GENERATION USING A BIREFRINGENT LENS WITH CONFOCAL DETECTION

BACKGROUND OF THE INVENTION

1. Field of the Invention

The present invention relates to the generation of focus error signals for use in the auto-focussing of optical data storage and retrieval systems. More specifically, the present invention relates to a method and apparatus for generating focus error signals based upon creating two focal planes in a return read beam using a birefringent lens, filtering the read beam using a confocally configured pinhole and deriving a focus error signal related to the difference in distance between the resulting points of focus within the focal planes and the pinhole.

2. Background

As a prerequisite to successful optical data storage, the optical head containing the focussing optics must be positioned properly within the storage layer of the optical storage medium. When recording or retrieving optical data it is essential that the optical head be positioned precisely at the desired storage point. Proper positioning of the optical head is typically carried out through auto-focusing techniques implemented by a servo system within the optical head. The signals that drive the auto-focussing process are generated by Focus Error Signal (FES) generator devices that are incorporated into the overall scheme of the optical delivery and detection system.

FES generator devices within optical delivery and detection systems have typically only been required to provide signals in instances where data storage is limited to a single or to a few layers within the optical storage medium. Current technology is generally limited to performing optical data storage on a minimal number of layers within the optical storage medium. In most instances, these layers have, generally, about 60 micron separation between adjacent layers. When such a pronounced distance separates the layers, the current FES generator devices are sufficient because layer separation does not present an issue.

However, as technological advances in data storage are made, the capability presents itself to store data on numerous layers within the storage medium. See for example U.S. patent application Ser. No. 09/016,382 filed on Jan. 30, 1998, in the name of inventor Hesselink et. al. (assigned to the assignors of the present invention) entitled "Optical Data Storage by Selective Localized Alteration of a Format Hologram" for a detailed discussion of layer definition by format hologram grating structures. That disclosure is hereby expressly incorporated herein by reference as if set forth fully herein.

When data storage is performed on multiple layers the distance separating such layers is minimized. As the separation between the layers shrinks to the about 3 to about 10 micron ranges, the ability to separate out these layers during focus error signal detection becomes more of a concern. The prior art methods are not capable of delineating between layers that are packed so closely together. The present invention serves to provide an FES generator device and a method for FES generation that is capable of differentiating the layers in optical storage medium that have numerous tightly packed layers separated at distances comparable to the Rayleigh range of the illuminating beam. Additionally, the FES generator device and the method of FES generation described herein can be used with a data storage device having multiple storage layers residing at discrete media layers spaced at distances that can be comparable to or substantially longer than the Rayleigh range.

BRIEF DESCRIPTION OF THE INVENTION

Briefly, and in general terms, one embodiment of the present invention comprises an improved focus error signal generator device including two optical lenses in series; a birefringent optical lens followed by a standard optical lens, the lenses being disposed in the path of a return read beam wherein the birefringent optical lens has a first and second focal plane and the standard optical lens serves to minimize the focal lengths. A pinhole is disposed in the path of the return read beam in close proximity to the first and second focal planes. A polarizing beam splitter is positioned after the second focal plane and serves to split the return read beam into two light beams of polarization associated with the first and second focal planes. First and second detectors are positioned so as to read the two light beams signals output from the polarizing beam splitter and the detectors are connected to an electrical differencing circuit having an output to an optical head servo system.

Another aspect of the present invention comprises a method for focus error signal generation including the steps of focussing a return read beam at first and second points of focus; providing a pinhole in the path of a return read beam located in close proximity to the first and second points of focus; providing for a polarizing beam splitter disposed in the path of the return read beam after the second point of focus that splits the return read beam into first and second polarization beams; providing for first and second detectors, respectively, in the paths of the corresponding first and second polarization beams; and generating a focus error signal related to the difference between the output of the first detector and an output of the second detector.

Additionally, another embodiment of the present invention comprises an optical data delivery and detection system comprising a laser source emitting a light beam, an optical head that receives the light beam, optical lenses within the optical head that focus the light beam on an optical storage media, a data detector that receives the light beam on the beam's return path and provides data signals and a focus error generator device as described herein.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1A:
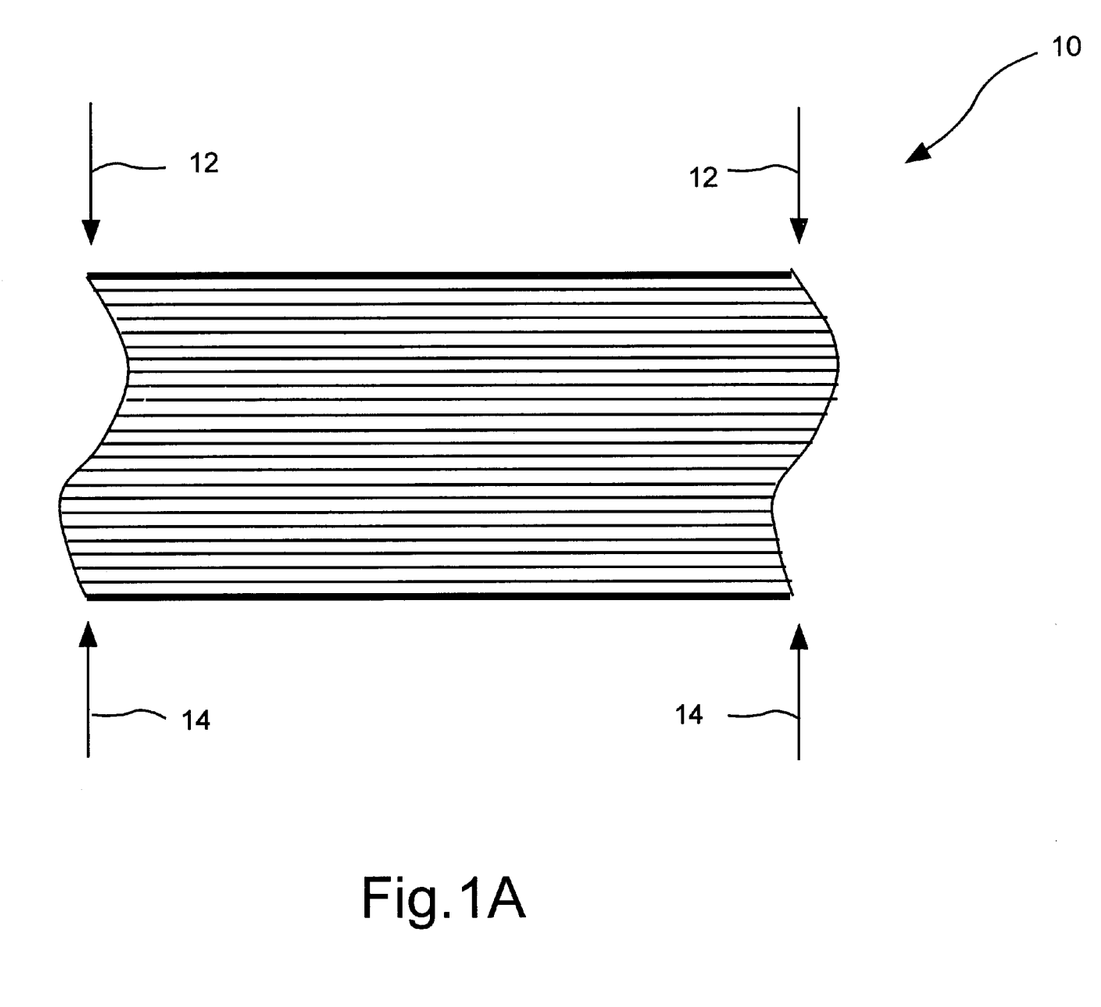
FIG. 1A is an illustration of a simple format hologram grating structure being written by exposing holographic storage medium to two beams of mutually coherent light.
Figure 1B:
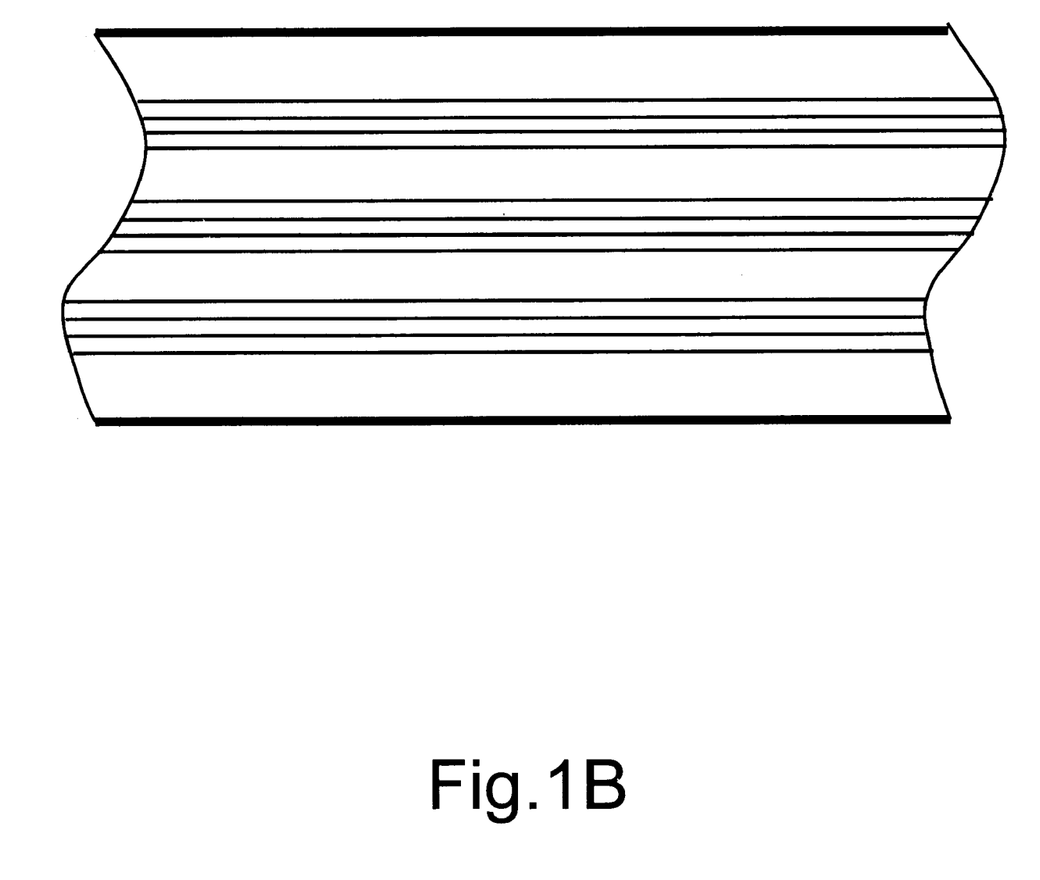
FIG. 1B is an illustration of a complex format hologram grating structure having layer definition generated by superimposing two planar hologram gratings whose vectors are perpendicular to the storage medium surface.

Referring to FIG. 1A, simple format volume hologram 10 is written by exposing a holographic material to two beams of mutually coherent light. In particular, two plane waves incident from opposing sides generate a planar reflection hologram, whose orientation and spatial frequency are governed by the wavelength and angles of incidence of the beams. For example, beam 12 and beam 14 are incident on opposite sides of the material. For optimal reflection, the hologram is Bragg-matched at the readout to a range of angles within the cone of the focused readout beam. This property is the basis of data storage by selective localized alteration of a format hologram grating structure. Confocal detection isolates the light reflected from the focus. The selective localized alteration serves to change the reflectivity at the waist of a focused beam that can be measured using confocal detection; in this manner, data are represented by the localized changes in reflectivity of the format hologram. A variety of complex format holograms can be generated, including layer definition by superimposing two planar hologram gratings whose vectors are perpendicular to the medium surface, as shown schematically in FIG. 1B.

Figure 2A:
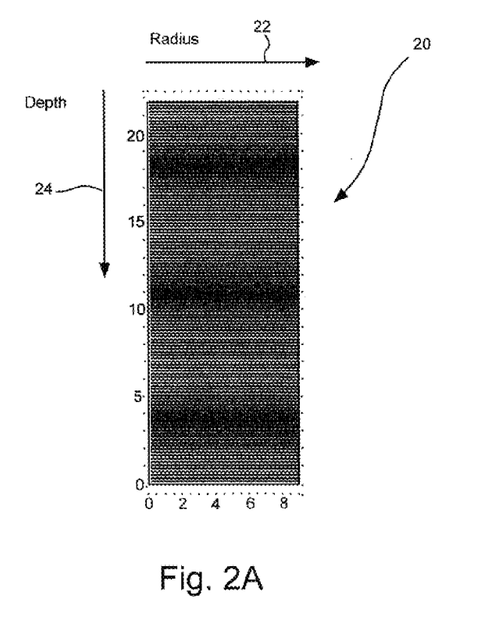
FIGS. 2A and 2B are cross sectional views of format hologram grating structures having two and four constituent holograms, respectively, for track and layer definition.
Figure 2B:
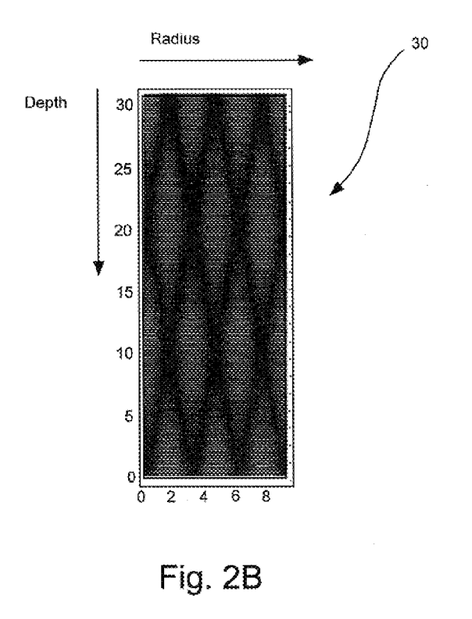
Figure 3A:
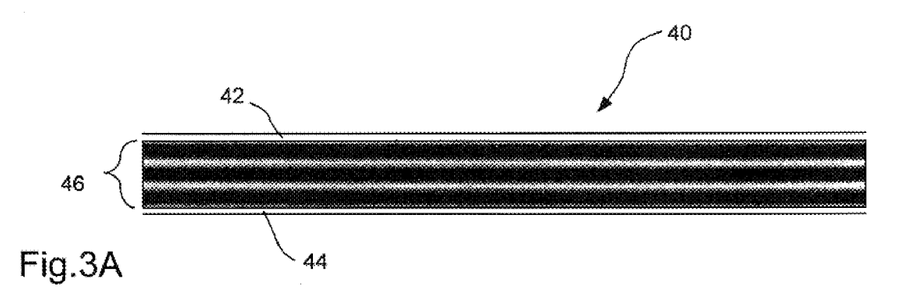
FIGS. 3A and 3B are cross sectional views of the optical storage devices containing the format hologram grating structures depicted in FIGS. 2A and 2B, respectively.
Figure 3B:
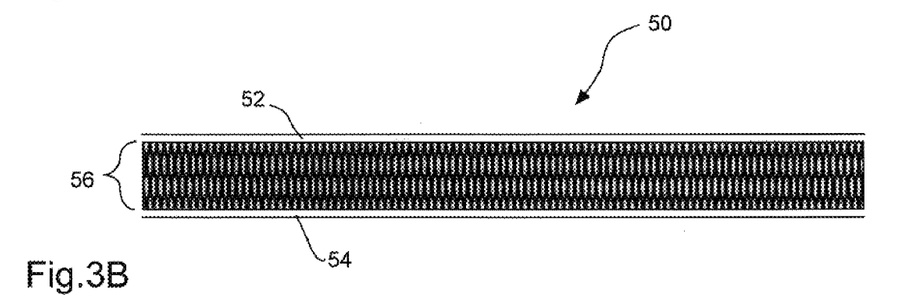

FIGS. 2A and 2B and corresponding FIGS. 3A and 3B are presented here as examples of storage medium that have multiple storage layers, closely spaced, at distances comparable to the Rayleigh range of the illuminating beam. In particular, FIGS. 2A and 2B and corresponding FIGS. 3A and 3B illustrate multiple storage layers within a bulk storage medium. The Rayleigh range storage media that is similar to the one shown here will benefit greatly from the Focus Error Signal (FES) Generator device of the present invention. Further, the present invention will also perform with storage medium having multiple storage layers residing at separate depths in the storage media spaced at distances that can be substantially longer than the Rayleigh range. The Rayleigh range of an illuminating beam is defined as the depth of focus, i.e. the distance over which the point of focus is within twice its minimum diameter. The Rayleigh range is well known by those of ordinary skill in the art.

Referring now to FIG. 2A and FIG. 2B, format hologram grating structures having complex structures for layer and track definition are shown. FIG. 2A shows a cross sectional view of format hologram grating structure 20 having two constituent holograms for track and layer definition. The radius of the format hologram grating structure is represented by horizontal axis 22 and the depth of the format hologram grating structure is represented by vertical axis 24. FIG. 2B shows format hologram grating structure 30 having four constituent hologram gratings for track and layer definition. These constituent holograms exist throughout the entire volume and locally interfere to produce a reflection hologram grating structure with a spatially varying envelope, as shown in FIGS. 2A and 2B. Methods for generating such format hologram grating structures are omitted from this disclosure in order to avoid overcomplicating the disclosure. For a detailed disclosure of generating two and four constituent format holograms and format hologram grating structures see, for example, U.S. patent application Ser. No. 09/016,382 filed on Jan. 30, 1998, in the name of inventors Hesselink et. al. entitled "Optical Data Storage by Selective Localized Alteration of a Format Hologram" and U.S. patent application Ser. No. 09/625,521 filed on Jan. 12, 1999, in the name of inventors Daiber et. al., entitled "Volumetric Track Definition for Data Storage Media Used to Record Data by Selective Alteration of a Format Hologram".

FIG. 3A is a cross-sectional view of storage device 40 corresponding to the format hologram grating structure of FIG. 2A. A transparent top cover layer 42 and a transparent bottom cover layer 44, that are typically formed from glass or a polymeric material, enclose holographic storage medium 46 in FIG. 2A. FIG. 3A shows the envelope of the local index perturbation of holographic storage medium 46, for which the carrier frequencies have been removed. Generally a reflected signal from a focused beam will be strongest when it is centered on a peak.

FIG. 3B is a cross-sectional view of storage device 50 corresponding to the format hologram grating structure of FIG. 2B. A transparent top cover layer 52 and a transparent bottom cover layer 54 serve to enclose holographic storage medium 56. Similar to FIG. 3A, FIG. 3B shows the envelope of the local index perturbation of holographic storage medium 56, for which the carrier frequencies have been removed. The magnitude profiles depicted in FIGS. 3A and 3B are a general indication of the expected reflectivity for a high numerical aperture, diffraction-limited beam focused into the holographic storage medium. The features of the format hologram grating structure and the relative thickness of the storage layer and cover layers are not to scale. The number of layers illustrated here is by way of example.

FIGS. 2A and 2B and corresponding FIGS. 3A and 3B illustrate format hologram grating structures that can be utilized for focusing and tracking using a variety of data writing methods, including data writing by selective alteration of the structure itself and data writing by affecting an optical property of the material without substantially affecting the underlying hologram grating structure.

Figure 4A:
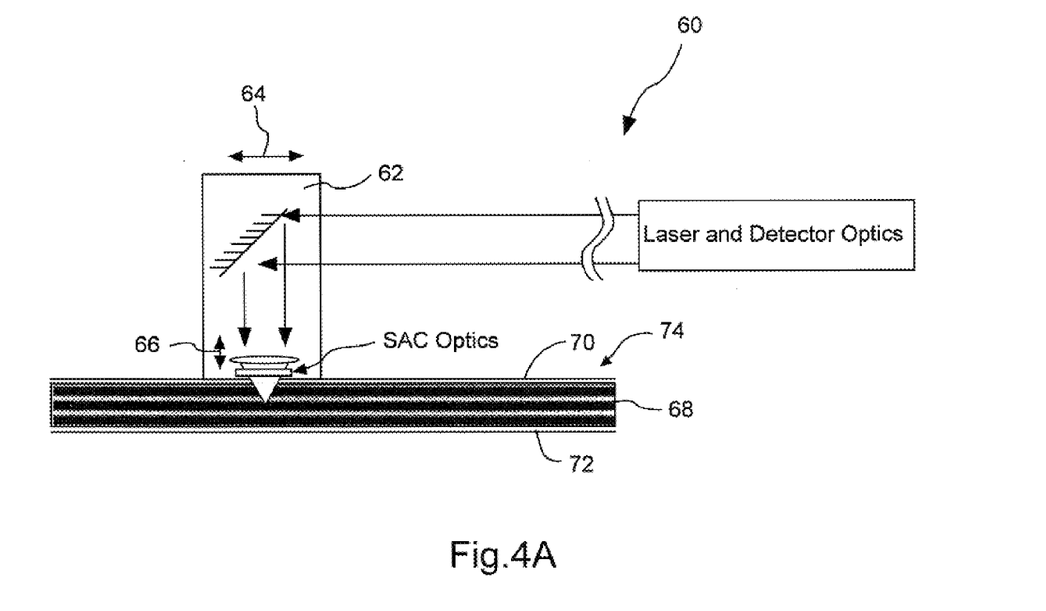
FIG. 4A is a schematic diagram of an optical head of an optical delivery and detection system in relation to a grating envelope of a depth only format hologram grating structure.

Referring now to FIG. 4A, a schematic of the optical head 62 component of an overall optical delivery and detection system 60 is shown. The optical head 62 can be moved radially, as shown by arrow 64, and in depth, as shown by arrow 66, to access different portions of a holographic storage medium 68. The illustrated holographic storage medium 68 has a format hologram grating structure stored therein. Other details of the structure of optical head 62, used for measuring intensity at a particular depth, are not necessary for an understanding of the present invention and are omitted to avoid overcomplicating the disclosure. The construction of an optical head for measuring the intensity at a particular depth of the material can be found in U.S. patent application Ser. No. 09/016,382 filed on Jan. 30, 1998, in the name of inventor Hesselink et. al., entitled "Optical Data Storage by Selective Localized Alteration of a Format Hologram", previously expressly incorporated herein by reference.

In the case of a disk, rotation brings different angular portions of holographic storage medium 68 into optical communication with optical head 62. In the case of a medium formed in card or tape (not shown in FIG. 4A), linear motion brings different lateral portions of the holographic storage medium to the optical head. FIG. 4A illustrates the position of optical head 62 in relation to a grating envelope of a depth only format hologram grating structure. The top layer 70 and the bottom layer 72 of holographic storage device 74 can comprise glass or a polymeric material. As a function of the vertical position of the focus, the reflected intensity is greatest when the focus is positioned at the center of a layer, and least when positioned between the layers. By way of example, focus servo can be achieved by wobbling the head vertically, measuring the change in intensity, and directing the head to be positioned where the reflection is highest.

Figure 4B:
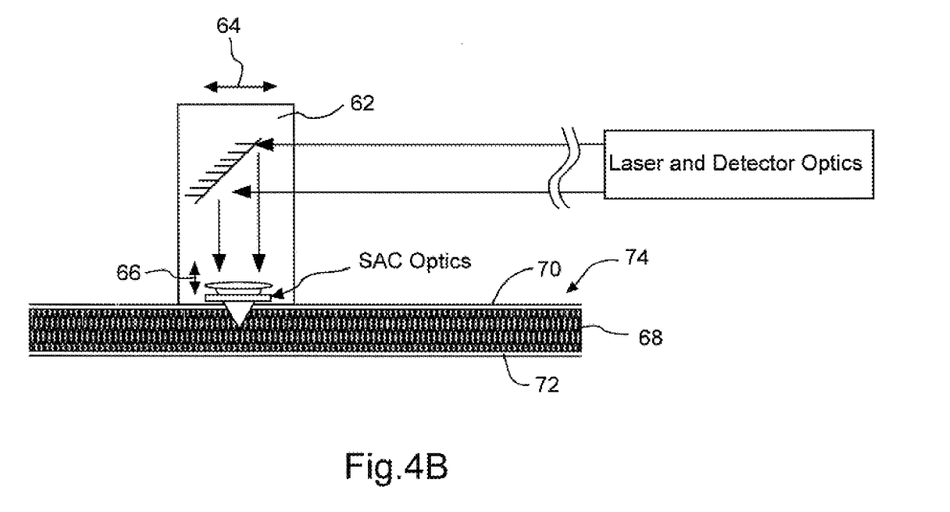
FIG. 4B is a schematic drawing of an optical head of an optical delivery and detection system in relation to a grating envelope of a depth and radial format hologram grating structure.

FIG. 4B illustrates an optical head 62 in relation to a grating envelope of a depth and radial format hologram grating structure. Layer selection may be achieved using the same simple focus servo; a tracking servo can be similarly achieved by wobbling optical head 62 transversely, measuring the change in intensity, and directing the head to be positioned where the reflection is highest.

Figure 5:
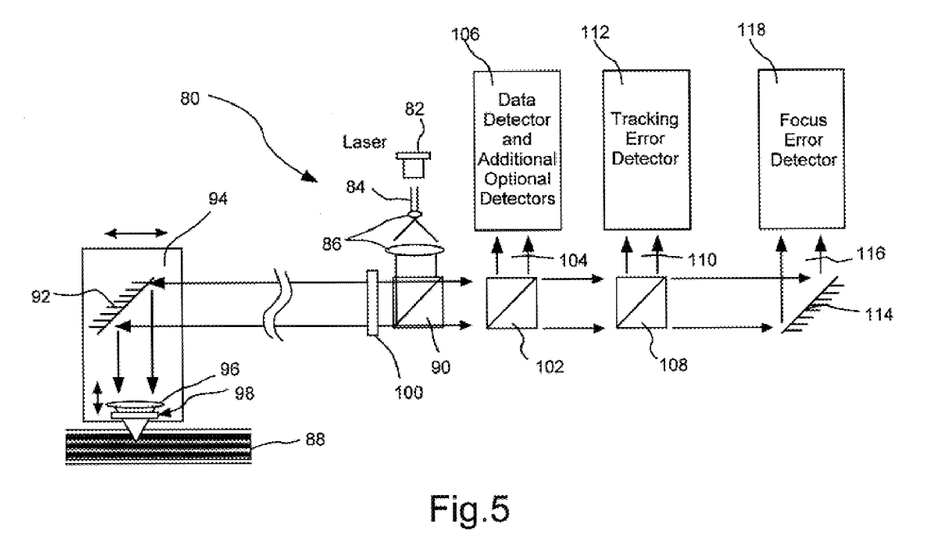
FIG. 5 is a schematic drawing of an optical delivery and detection system in relation to a grating envelope of a depth only format hologram grating structure.

FIG. 5 illustrates an optical delivery and detection system 80. Laser 82 illuminates beam 84 that is expanded by beam expansion optics 86 and directed towards holographic storage medium 88. Once the beam is expanded it passes through polarizing beam splitter 90 where it is directed towards first corner tuning mirror 92 located within optical head 94 and then directed towards objective lens 96. Variable spherical aberration correction (SAC) optics 98 can be used in conjunction with objective lens 96 to focus on different layers within holographic storage medium 88. The use of SAC optics 98 is particularly important when trying to reach depths within storage medium 88 in excess of approximately 100 microns. On the beam's forward and return paths, light passes through quarter wave plate 100 that serves to change the polarization of the beam. The use of polarizing beam splitter 90 and quarter wave plate 100 serves to increase the efficiency of the overall system 80. Alternatively, a standard 50/50 beam splitter can be used in place of polarizing beam splitter 90 and quarter wave plate 100. Once the polarization has been changed, the beam passes through polarizing beam splitter 90. The polarizing beam splitter 90 recognizes the change in polarization and directs the beam towards several operational paths. A fraction of the light is split in the direction of each path. A standard 50/50-beam splitter 102 directs a portion of the light in data path 104 towards data detector 106 and additional optional detectors (not shown in FIG. 4). The portion of light not directed toward data path 104 is directed towards second 50/50-beam splitter 108 that serves to direct a portion of the light in tracking path 110 toward tracking error detector 112. The portion of light not directed toward tracking path 110 is directed towards optional second corner turning mirror 114. Finally, the light is reflected off corner turning mirror 114 in auto-focus path 116 toward a focus error detector 118.

Figure 6:
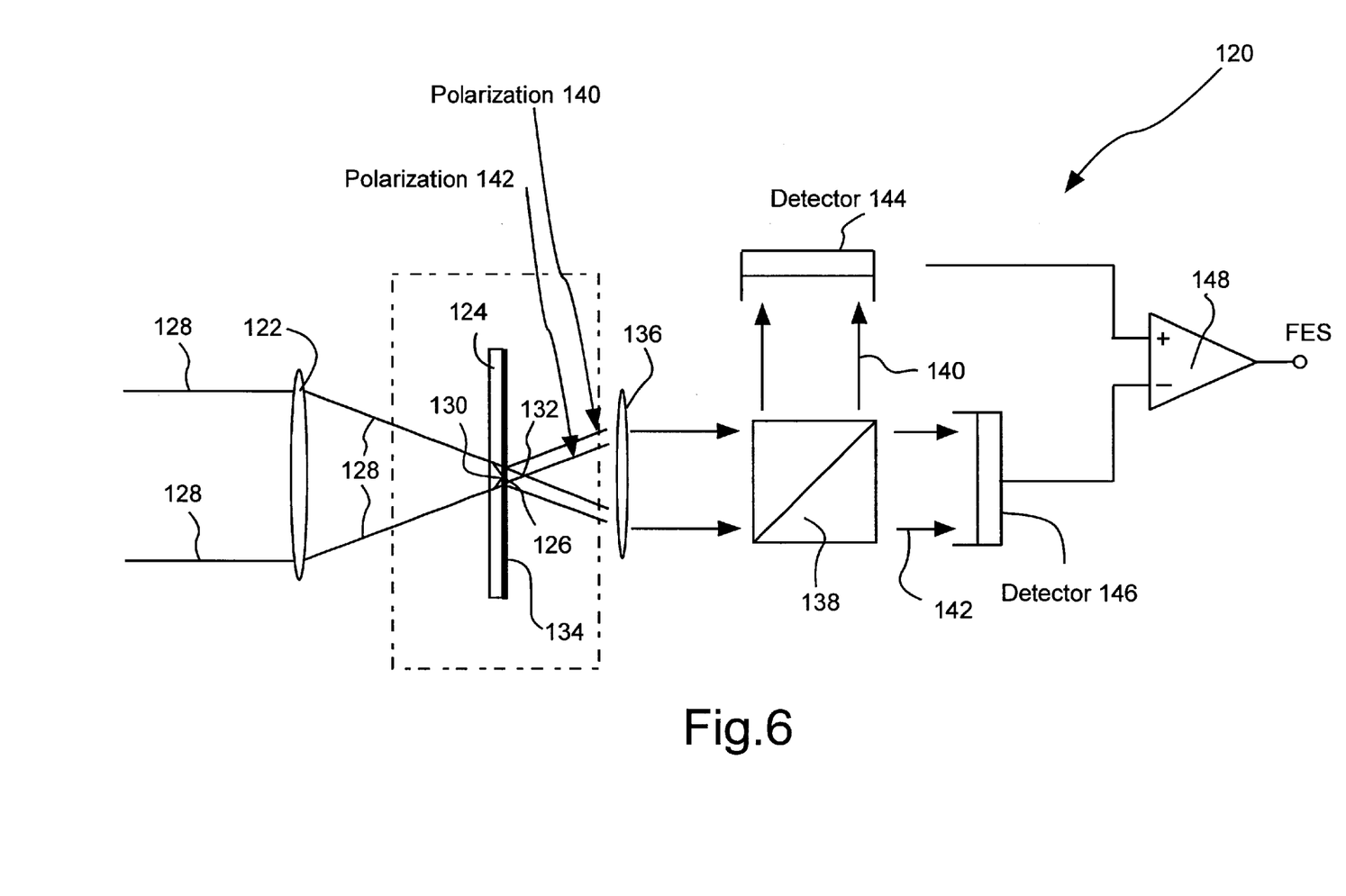
FIG. 6 is a schematic drawing of a focus error signal generator device, in accordance with a presently preferred embodiment of the present invention.

A presently preferred embodiment of the present invention is illustrated in FIG. 6. Shown in FIG. 6 is an improved focus error signal (FES) generator device 120 comprising birefringent optical lens 122 and pinhole 124. An optical head (not shown in FIG. 6) focuses light onto a data layer in a data storage medium. The data storage medium, by way of non-limiting example, may be comprised of either multiple layers of data storage or a bulk, monolithic holographic storage medium that has a format hologram grating stored therein to define layers. Read beam 126 enters FES generator device 120 on a return path from the data storage medium. Read beam 126 travels through birefringent optical lens 122 and first standard optical lens 128. As is known by those of ordinary skill in the art, birefringent optical lens 122 has two indices of refraction. Birefringent optical lens 122 may be formed from, for example, crystal calcite or any other birefringent material. The amount of shift in the indices of refraction may be an appropriate consideration when choosing the birefringent material that will form birefringent optical lens 122.

First standard optical lens 128 is an optional element of FES generator device 120 that is used to further define the focal lengths of the two indices of refraction resulting from birefringent optical lens 122. First standard optional lens 128 is used to adjust the average center focal length to a value convenient to the physical constraints of the FES generator device 120. It is possible and within the inventive concept herein disclosed to configure FES generator device 120 without first standard optical lens 128. First standard optical lens 128 is typically formed from glass or a polymeric material.

Once read beam 126 has passed through birefringent optical lens 122 and first standard optical lens 128, read beam 126 will comprise a first polarization portion 130 and a second polarization portion 132. First polarization portion 130 has a corresponding first point of focus 134 within an associated first focal plane (not shown in FIG. 6). Second polarization portion 132 has a corresponding second point of focus 136 within an associated second focal plane (not shown in FIG. 6).

Positioned in close proximity to first point of focus 134 and second point of focus 136 is a plate 138 with pinhole 124 formed therein. Pinhole 124 is disposed within plate 138 so that it lies in the path of first polarization portion 130 and second polarization portion 132. Pinhole 124 serves to confocally filter read beam 126 (i.e. first polarization portion 130 and second polarization portion 132). Pinhole 124 is, typically, formed in a glass plate that is coated with a metal foil. The size of pinhole 124 is dependent upon the effective focal length of the combination of birefringent optical lens 122 and first standard optical lens 128, the diameter of the read beam 126 and the wavelength of read beam 126. By way of example, pinhole 124 may be sized so that 90% of intensity of the read beam passes through the pinhole when the pinhole is positioned at a point of focus. The pinhole may typically range in size from about 1 micron in diameter to about 50 microns in diameter, and is typically about 8 microns in diameter. Those skilled in the art will realize that the pinhole formation can be accomplished in a variety of maimers. The pinhole configuration that is shown here is by way of example only and is not intended to be in any way limiting.

After read beam 126 has been filtered through pinhole 124 it is transmitted through second standard optical lens 140. Second standard optical lens 140 is, typically, a standard glass or polymeric lens. Second standard optical lens 140 serves maximize the performance of the polarizing beam splitter 142 by directing read beam 126 towards polarizing beam splitter 142. Second standard optical lens 140 is an optional element of FES generator device 120. It is possible and within the inventive concept herein disclosed to configure FES generator device 120 without second standard optical lens 140 in instances where the focal length and beam diameter of read beam 126 are such that the use of second standard optical lens 140 would not be required. Polarizing beam splitter 142 separates the light of first polarization portion 130 from the light of second polarization portion 132. Light of first polarization portion 130 is directed towards detector 144 and light of second polarization portion 132 is directed towards detector 146.

Detector 144 and detector 146 may be standard photodiodes that serve to convert light beam photons to electrical signals in the form of electrons (an electrical current). The electrical signal is then provided to electronic differencing circuit 148 that generates a focus error signal. A servo system (not shown in FIG. 6) uses the focus error signal to direct the position of the objective lens in the optical head, thus completing the auto-focus procedure. Servo systems are well known in the art.

In contrast, in a prior-art data detection arm (shown in FIG. 5 at 106), a pinhole is generally used for confocal depth selection, and is generally situated so that light reflected from the desired depth—the focus of the read beam—comes to a focus in the plane of the pinhole, passing efficiently through it. For the FES generator device 120 shown in FIG. 6, when the optical head is focused on a layer within the storage medium first polarization portion 130 will form first point of focus 134 before pinhole 124 and second polarization portion 132 will form second point of focus 136 after pinhole 124.

The plate containing the pinhole is characteristically mounted within a FES generator device housing (not shown in FIG. 6) with the aid of a precision alignment fixture. Use of such alignment fixtures to position elements, such as pinhole plates, are well known by those of ordinary skill in the art.

Figure 7A:
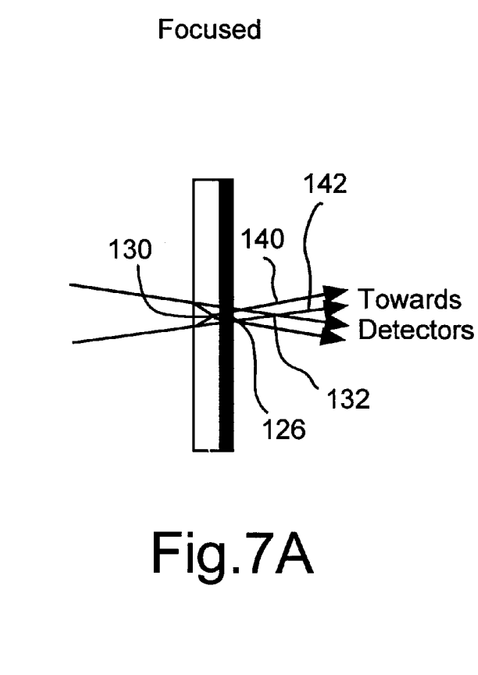
FIG. 7A is an illustration of an example of ideal positioning of the point of focus in relation to the pinholes, in accordance with a presently preferred embodiment of the present invention.

The positioning of the points of focus in relation to the pinhole is instrumental in determining proper auto-focus. The ideal positioning of the points of focus are shown in FIG. 7A. This ideal positioning is achieved when the optical head is properly focused on the desired layer within the storage medium with respect to the depth of a data layer or layer center. First polarization portion 130 has first point of focus 134 slightly before pinhole 124 and second polarization portion 132 has second point of focus 136 slightly after pinhole 124. For this configuration, the intensities detected for first polarization portion 130 and second polarization portion 132 are equivalent.

Figure 7B:
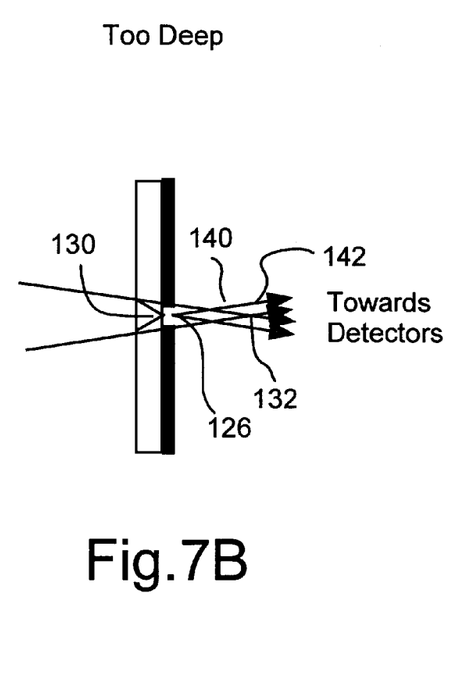
FIG. 7B is an illustration of an example of point of focus positioning in relation to the pinholes when the light beam is focussed too deeply within the storage medium, in accordance with a presently preferred embodiment of the present invention.
Figure 7C:
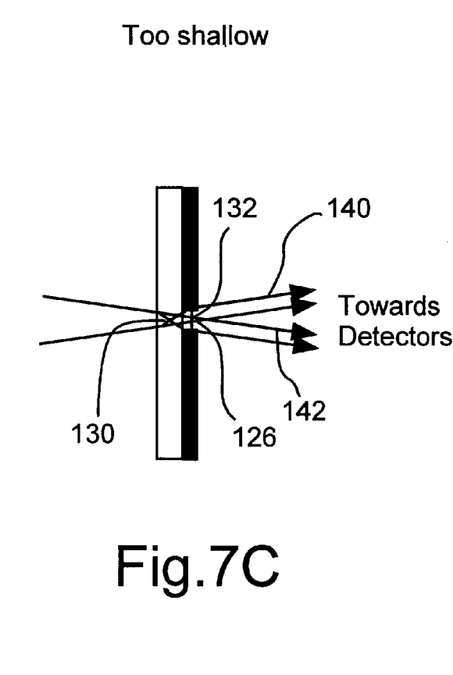
FIG. 7C is an illustration of an example of point of focus positioning in relation to the pinholes when the light beam is focussed too shallowly within the storage medium, in accordance with a presently preferred embodiment of the present invention.

FIGS. 7B and 7C illustrate light beams that are focused either too deeply or too shallowly within the storage medium with respect of the depth of a layer or layer center. FIG. 7B gives an example of focusing too deeply within the storage medium. If the optical head is focused too deeply into the medium, first point of focus 134 and second point of focus 136 in the FES generator device are shifted towards the detectors (not shown in FIG. 7B). For moderate perturbations, at pinhole 124, the read beam is more tightly focused for first polarization portion 130 and less tightly focused for second polarization portion 132. Therefore, more light is transmitted via first polarization portion 130 than second polarization portion 132 and, thus, more light is detected by the detector associated with first polarization portion 130 than the detector associated with second polarization portion 132.

FIG. 7C provides an example of the optical head being focused too shallowly into the medium, resulting in first point of focus 134 and second point of focus 136 being shifted away from the detectors (not shown in FIG. 7C). For moderate perturbations, at pinhole 124, the read beam is more tightly focused for second polarization portion 132 and less tightly focused for first polarization portion 130. Therefore, more light is transmitted via second polarization portion 132 than first polarization portion 130 and, thus, more light is detected by the detector associated with second polarization portion 132 than the detector associated with first polarization portion 130. Thus, a simple difference in the intensities of the light indicates in which direction the optical head is out of focus.

A simple differencing circuit can be employed to generate a focus error signal in the present invention. For example, a first detector A outputs a current which is converted to a voltage A, and a second detector B outputs a current that is converted to a voltage B. Current-to-voltage techniques are well known in the art. The focus error signal (A−B) is positive when the focus is too deep, and negative when the focus is too shallow. Furthermore, the signal (A−B) is stronger as the beam is further out of focus. The focus error signal can be further normalized to the total strength (A+B) in order to compensate e.g. for fluctuations in laser strength. The focus error signal can be used to position the optical head so that it focuses on a layer e.g. by defining the minimum and maximum tolerable value limits D1<(A−B)÷(A+B)<D2; where D1 is the minimum limit and D2 is the maximum limit When the normalized focus error signal (A−B)÷(A+B) falls outside this range, the head is moved in the appropriate direction to bring it within this range, thus focusing on a particular layer.

Figure 8A:
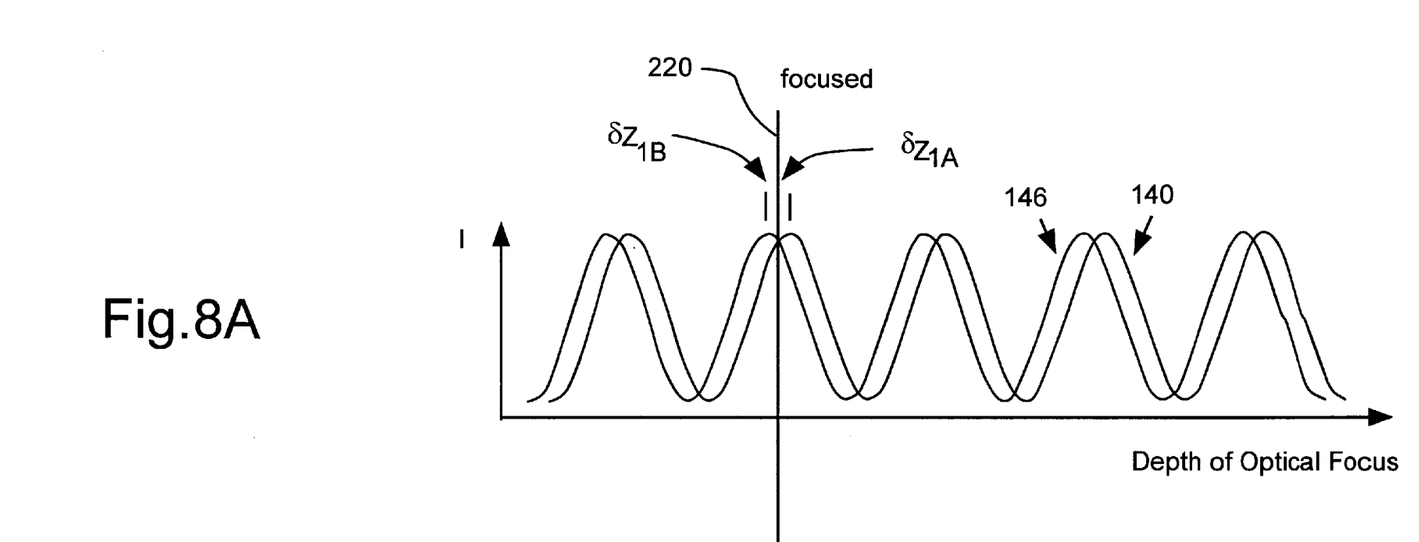
FIG. 8A is a graphical representation of signal intensity versus depth of optical focus for two detectors, in accordance with a presently preferred embodiment of the present invention.
Figure 8B:
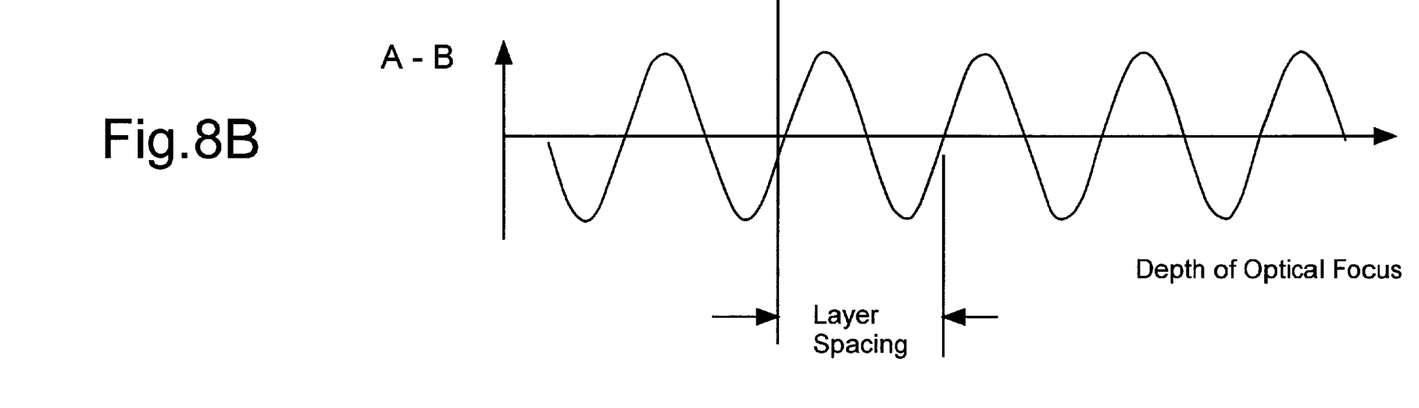
FIG. 8B is a graphical representation of the strength of the focus error signal versus depth of optical focus, in accordance with a presently preferred embodiment of the present invention.

Referring now to FIG. 8A, signal intensities for first detector A and second detector B are shown as a function of depth of the material. The vertical line 220 indicates a particular depth of a formatted layer. At this depth, first detector A and second detector B provide the same output voltage that corresponds to the same signal strength. Referring now to FIG. 8B, the value of the focus error signal (A−B) is shown as a function of depth of the material. If the beam from the optical head is focused too deeply with respect to the nearest layer, then the focus error signal (A−B) is positive, and therefore the normalized focus error signal (A−B)÷(A+B) is positive. If the beam from the optical head is focused too shallowly with respect to the nearest layer, then the focus error signal (A−B) is negative, and therefore the normalized focus error signal (A−B)÷(A+B) is negative. Both the value of the focus error signal (A−B) and its slope can be used together to determine the direction and distance the optical head must be moved to restore focus to the nearest layer. Alternatively, the value of the normalized focus error signal and its slope can be used together to determine the direction and distance the optical head must be moved to restore focus to the nearest layer. Furthermore, the value of the focus error signal (A−B) and its slope can be used to supplement the evaluations based on a normalized focus error signal. Layer selection is accomplished by keeping track of the number of layers crossed as the optical head passes from the first layer it encounters to the others.

Figure 9:
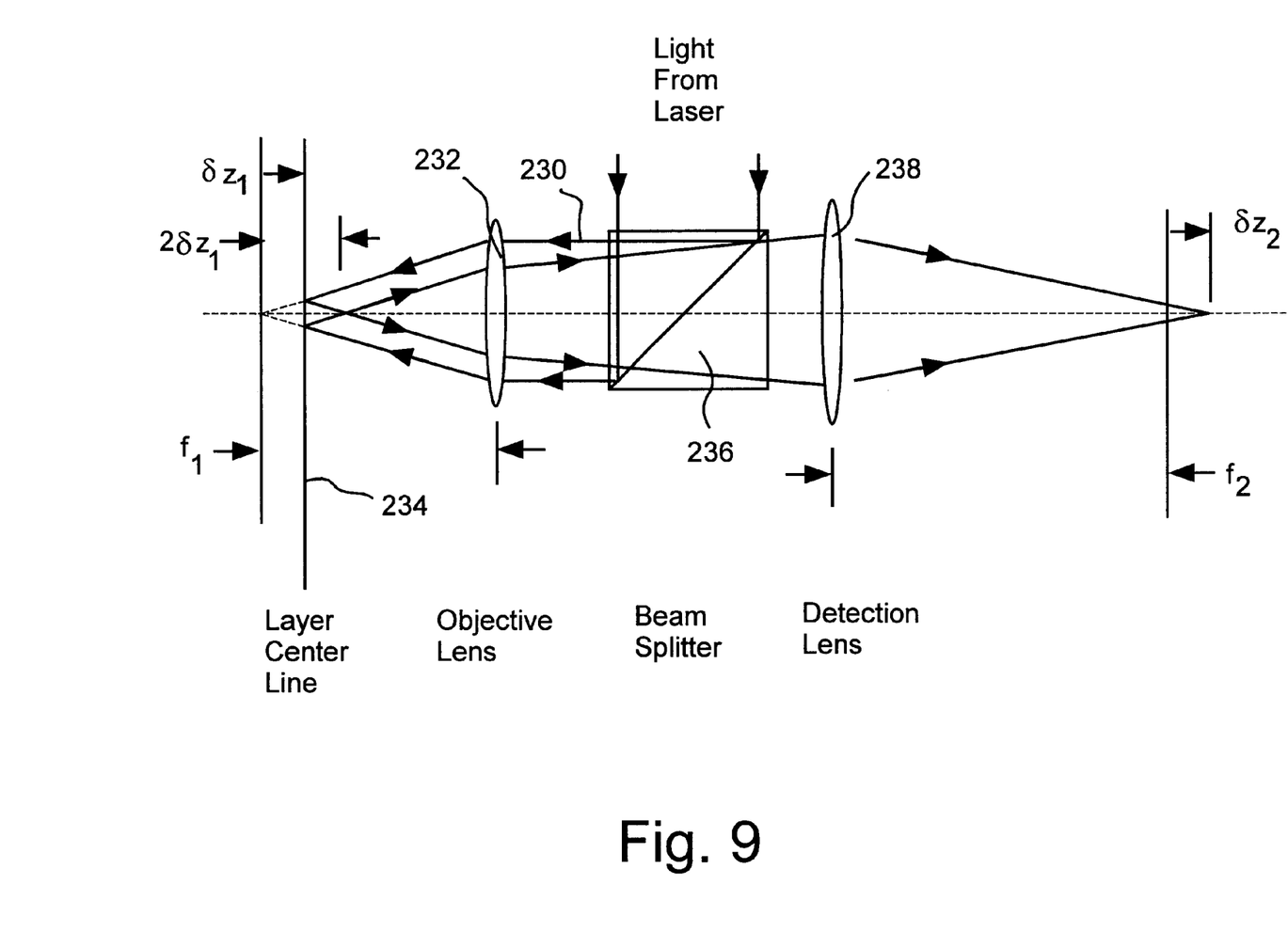
FIG. 9 is a schematic drawing of an optical head showing the general effect on the light beams when the head is not focused properly.

The strength of the focus error signal defined by (A−B) in FIG. 8B is proportional to the phase shift of the two signals A and B, illustrated in FIG. 8A. This relationship can be understood by referring to FIG. 9, which shows the general effect on the light beams when the head is not focused on a layer. FIG. 9 does not include all critical parts of the optical head, such as a spherical aberration corrector, but illustrates the effects of out-of-focus head position. For clarity, the figure does not illustrate effects of the index of refraction of the material; these effects would be apparent to those skilled in the art of optical sciences. In FIG. 9, the layer is indicated by a single reflecting surface for illustration purposes only.

Referring to FIG. 9, a light beam 230 passes through the objective lens 232, is reflected by the layer 234, turns through the objective lens 232, passes through the beam splitter 236, and is then focused by the detection lens 238. The focal position of the light retuning to the objective lens 232 is shifted by twice the depth positioning error. As would be apparent to those skilled in the optical sciences, the focus position in the detection optics therefore shifts by $\delta z_2 = (2\delta z_1/n)(f_2/f_1)^2$. In this equation n is the index of refraction of the material, f1 is the focal length of objective lens 232, f2 is the focal length of the detection lens 238, $\delta z_1$ is the depth positioning error, and $\delta z_2$ is the focal shift in the FES generator. An axial pinhole displacement $\delta z_2$ therefore results in a detected phase shift of $\delta z_1 = (n/2)\delta z_2(f_1/f_2)^2$ as illustrated in FIG. 8A.

Equivalently, the condition for strongest focus error signal can be cast in terms of the pinhole placement with respect to the layer spacing imaged by the detection lens. The strongest focus error signal (A−B) is achieved when the axial pinhole displacement is set such that the displacement of the pinhole from the point of focus for polarization A is adjusted to optionally detect a depth positioning error of $\delta z_{1A} = (¼)\Delta z$, and for polarization B is adjusted to optionally detect a depth positioning error of $\delta z_{1B} = -(¼)\Delta z$, where $\Delta z$ is the spacing of the layers as measured by the optical focus displacement (FIG. 8B). For data detection, however, it is generally preferred that the pinhole reside equal distance from the points of focus of the beam, for which the displacement would be less than the Rayleigh range of the optical focus in the material (e.g. $\Delta z_{1A} = -\delta z_{1B} = (½)z_R$, where $z_R$ is the Rayleigh range of the beam focused in the material). Thus, it is generally preferred that the data detection and focus error generation optics described herein are in separate arms/paths (as shown in FIG. 5)

Equivalently, the condition for strongest focus error signal can be cast in terms of the pinhole placement with respect to the layer spacing imaged by the detection lens 238. In these terms, the strongest focus error signal (A−B) is achieved when the axial pinhole displacement from the point of focus for polarization A is $\delta z_{2A} = (¼)\Delta z'$, and for polarization B is $\delta z_{2B} = -(¼)\Delta z'$, where $\Delta z' = (2\Delta z/n)(f_2/f_1)^2$ which is the spacing of the layers as measured by the optical focus displacement (FIG. 9B). If it is required that the two signals A, B be in focus (e.g. to detect data), then the phase shift should be reduced to less than the Rayleigh range of the optical focus of the detection lens (e.g. $\delta z_{2A} = -z_{2B} = (½)z_R'$, where $z_R'$ is the Rayleigh range of the beam focused by the detection lens).

In an alternative preferred embodiment of the present invention, a focus error signal (B−A) can be generated to keep the beam focused on the nulls between data layers. This may be advantageous for data recording that does not utilize selective localized alteration of a format hologram.

Due to the properties of confocal detection, the pinhole diameter should be less than or equal to the diameter of the optical beam reflected from the material for optimal rejection of out-of-focus signals from other layers. In contrast, for maximum signal strength and positioning tolerance, the pinhole diameter should be greater than or equal to the optical beam diameter. A particular choice that balances these constraints is to set the pinhole size to just pass nearly all of the optical intensity of the non-aberrated beam. By way of example, the pinhole size can be selected so that 90% of intensity of the light beam passes through the pinhole when the pinhole is positioned at the beam focus.

The present invention can also be practiced to keep an optical head focused on tubular format regions (tubular format cross-sectional regions are illustrated in the storage medium of FIGS. 2B, 3B and 4B). The round cross sections sweep out tubular format regions throughout the radius of the material that result from complex format hologram grating structures. In this case, the reflected light detected by the system is relatively small between the tubes. Thus, the beam must be kept radially positioned on the data tube in order to remain focused on a particular data layer. Some tracking methods used for single layer and multiple media layer storage devices can be adapted for use in this invention as disclosed. By way of example, one such method of tracking comprises wobbling the focused spot radially, measuring the change in intensity, and directing the head to be positioned where the reflection is highest which correspond to the track centers. The operation of the focus error generator device of the present invention is otherwise the same.

Although illustrative presently preferred embodiments and applications of this invention are shown and described herein, many variations and modifications are possible which remain within the concept, scope and spirit of the invention, and these variations would become clear to those skilled in the art after review of this disclosure. The invention, therefore is not limited except in spirit of the appended claims.

What is claimed is:

1. An apparatus for generating a focus error signal from a read light beam returning from an optical storage media comprising:
   a birefringent lens disposed in the path of said read light beam, said birefringent optical lens creating a first focal plane of a first polarization and a second focal plane of a second polarization;
   a pinhole disposed in the path of said read light beam after said first optical lens and in close proximity to said first and second focal planes;
   a polarizing beam splitter disposed in the path of said read light beam after said second focal plane, said polarizing beam splitter creating a first polarization beam and a second polarization beam from said read light beam;
   a first optical detector disposed in the path of said first polarization beam;
   a second optical detector disposed in the path of said second polarization beam; and
   an electrical differencing circuit having a first input coupled to said first optical detector, a second input coupled to said second optical detector and an output.

2. An apparatus in accordance with claim 1, wherein said electrical differencing circuit generates a focus error signal related to the difference between the output of said first optical detector and the output of said second optical detector.

3. An apparatus in accordance with claim 1, wherein said electrical differencing circuit generates a focus error signal related to the difference between the distance from said first focal plane to said pinhole and the distance from said second focal plane to said pinhole.

4. An apparatus in accordance with claim 1, further comprising:
a first optical lens disposed in the path of said read light beam after said birefringent lens and before said pinhole.

5. An apparatus in accordance with claim 1, further comprising:
a second optical lens disposed in the path of said read light beam after said second focal plane and before said polarizing beam splitter.

6. An apparatus in accordance with claim 1, wherein said pinhole has a diameter that allows for the passage of about 90% of the intensity of said read light beam when said pinhole is positioned at a point of focus within a focal plane.

7. An apparatus for generating a focus error signal from a read light beam returning from an optical storage media:
means for focussing said read light beam at a first point of focus within a first focal plane of a first polarization and a second point of focus within a second focal plane of a second polarization;
means for confocal light beam filtration disposed in the path of said read light beam in close proximity to said first point of focus and said second point of focus;
means for polarization beam splitting said read light beam into a first polarization beam and a second polarization beam;
means for first optical detection in the path of said first polarization beam;
means for second optical detection in the path of said second polarization beam; and
means for generating a focus error signal related to the difference between an output from said means for first optical detection and an output from said means for second optical detection.

8. A method for generating a focus error signal from a read light beam returning from an optical storage media comprising the steps of:
focussing said read light beam at a first point of focus within a first focal plane and a second point of focus within a second focal plane;
providing a pinhole in the path of said read light beam in close proximity to said first and second point of focus;
providing a polarizing beam splitter disposed in said path of said read light beam after said second focal plane, said polarizing beam splitter creating a first polarization beam and a second polarization beam from said read light beam;
providing a first optical detector in the path of said first polarization beam;
providing a second optical detector in the path of said second polarization beam; and
generating a focus error signal related to the difference between an output from said first optical detector and an output from said second optical detector.

9. A method in accordance with claim 8, wherein the step of generating a focus error signal further comprises:
generating a focus error signal related to the difference between the distance from said first point of focus to said pinhole and the distance from said second point of focus to said pinhole.

10. A method in accordance with claim 8, further comprising the steps of:
providing a birefringent lens through which said read light beam passes to create said first point of focus within said first focal plane and said second point of focus within said second focal plane.

11. A method in accordance with claim 8, further comprising the steps of:
providing an optical lens through which said read light beam passes after said second point of focus and before said polarization beam splitter.

12. A method in accordance with claim 8, further comprising the steps of:
positioning said pinhole after said first focal plane; and
positioning said pinhole before said second focal plane.

13. A method in accordance with claim 8, further comprising the steps of:
providing said pinhole with a diameter that allows for passage of about 90% of the intensity of said read light beam when said pinhole is positioned at said first point of focus.

14. A method in accordance with claim 8, further comprising the steps of:
providing said pinhole with a diameter that allows for passage of about 90% of the intensity of said read light beam when said pinhole is positioned at said second point of focus.

15. A system for optical delivery and detection comprising:
a laser source that emits a first light beam;
an optical head that receives said first light beam;
an optical lens within said optical head that focuses said first light beam on a location within a storage media;
a data detector that receives said first light beam retuning from said storage media and provides data signals;
a tracking error detector that receives said first light beam returning from said storage media and provides a tracking error signal to said optical head; and
a focus error signal generator that receives said first light beam returning from said optical storage media and provides a focus error signal to said optical head, said focus error signal generator including:
a birefringent lens disposed in the path of said first light beam, said birefringent optical lens creating a first focal plane of a first polarization and a second focal plane of a second polarization;
a pinhole disposed in the path of said first light beam after said first optical lens and in close proximity to said first and second focal planes;
a polarizing beam splitter disposed in the path of said first light beam after said pinhole, said polarizing beam splitter creating a second light beam of first polarization and a third light beam of second polarization from said first light beam;
a first optical detector disposed in the path of said second light beam;
a second optical detector disposed in the path of said third light beam; and
an electrical differencing circuit having a first input coupled to said first optical detector, a second input coupled to said second optical detector and an output.

16. A system in accordance with claim 15, wherein said storage media has layer separation ($\Delta z$), said layer separation having a corresponding spacing ($\Delta z'$) as measured by an optical focus displacement and wherein said pinhole is placed ($\frac{1}{4}$)$\Delta z'$ from said first focal plane and said pinhole is placed $-(\frac{1}{4})\Delta z'$ from said second focal plane.

* * * * *